United States Patent [19]

Hosogoe et al.

[11] Patent Number: 5,365,605
[45] Date of Patent: Nov. 15, 1994

[54] IMAGE SCANNER INCLUDING VIEWING WINDOW

[75] Inventors: Junichi Hosogoe; Kiyoshi Kimura, both of Miyagi, Japan

[73] Assignee: Alps Electric Co., Ltd., Tokyo, Japan

[21] Appl. No.: 719,083

[22] Filed: Jun. 17, 1991

Related U.S. Application Data

[63] Continuation of Ser. No. 609,122, Oct. 31, 1990, abandoned, which is a continuation of Ser. No. 403,847, Aug. 31, 1989, abandoned, which is a continuation of Ser. No. 134,763, Dec. 18, 1987, abandoned.

[30] Foreign Application Priority Data

Mar. 9, 1987 [JP] Japan .............................. 62-33098[U]
Apr. 24, 1987 [JP] Japan .............................. 62-61468[U]

[51] Int. Cl.⁵ .................. G06K 9/22; G06K 7/10; G06K 9/20
[52] U.S. Cl. ............................ 382/59; 382/65; 235/472
[58] Field of Search ............. 382/59, 65; 340/710; 434/181, 182; 235/472; 345/163

[56] References Cited

U.S. PATENT DOCUMENTS 2,730,811  1/1956  Gouldsmith ................ 33/670
3,699,312 10/1972  Jones et al. ............... 235/472
3,719,999  3/1973  Harrington ................ 33/27.02
4,251,798  2/1981  Swartz et al. .............. 382/59

FOREIGN PATENT DOCUMENTS 3427658  2/1985  Germany ................... 340/710
0129871 10/1980  Japan ...................... 382/59
0108972  7/1982  Japan ...................... 340/710
0107130  6/1985  Japan ...................... 340/710

*Primary Examiner*—Jose L. Couso
*Assistant Examiner*—Michael Cammarata
*Attorney, Agent, or Firm*—Guy W. Shoup; Patrick T. Bever

[57] ABSTRACT

In a handy type image scanner, information of an original is observed through an window formed on a case of the image scanner. The handy type image scanner includes a case which encloses a light source for illuminating an original, a reflecting mirror for conducting light reflected from the original to a predetermined direction, and an image sensor for receiving the light from the reflecting mirror so as to input information of the illuminated original. The case includes an upper surface which has a window for observing the information displayed on the original which is being optically read out by the image sensor.

18 Claims, 4 Drawing Sheets

IMAGE SCANNER INCLUDING VIEWING WINDOW

This application is a continuation of Ser. No. 07/609,122 filed Oct. 31, 1990 which is a continuation of Ser. No. 07/403,847, filed Aug. 31, 1989, which is a continuation of Ser. No. 07/134,763, filed Dec. 18, 1987, all abandoned.

BACKGROUND OF THE INVENTION

1. Field of the Invention

The present invention generally relates to an image scanner, and more particularly, to a handy type image scanner for optically reading information such as characters and patterns displayed on an original by moving a case of the image scanner with respect to the fixed original.

2. Description of the Related Art

To display information data of information sources (originals) illustrating characters and patterns, as CRT (cathode-ray tube) images and hard copies, an image scanner has been widely utilized as an information input source. Depending upon the scanning methods, the image scanners are categorized into the following two modes. In the first mode, the information of the original is optically scanned by the image scanner while moving the original over the fixed image scanner. In the second mode, the information of the original is optically scanned by the image scanner while moving the image scanner over the fixed original.

In the conventional image scanner moving mode, one portion corresponding to the image scanner has been integrally formed with the other portion for processing the information input by the image scanner. Very recently, the image scanner is separately provided with the input data processing device. Thus, a handy type image scanner has been proposed which is manually movable on an original. Since such a handy type image scanner has various advantages in that an easy operable image scanner can be realized and only a portion of an original can be scanned which is required to be input, it may be widely utilized as an image scanner.

To input information of an original by employing a handy type image scanner, it is required to visually recognize a relative position between the original and the image scanner in order that the desirable information displayed position of the original does not depart from the readable range. Particularly, in a handy type image scanner, most of the input information data are constructed of a portion of the original, and moreover, the scanning direction of the image scanner may become unstable because the image scanner is manually scanned over the original. As a result, an excessive attention is required to a scanner operator, and the desired information of the original is not sometimes correctly input into the image scanner. In other words, if the recognition can be made in real time whether or not the desirable information of the original is located within the readable range, both the reliability and operability may be considerably improved particularly in the handy type image scanners.

SUMMARY OF THE INVENTION

The present invention has been accomplished in an attempt to solve the above-described problems as well as to satisfy the above desires, and therefore has an object to provide an image scanner comprising:

a light source for illuminating an original;

a reflecting mirror for conducting light reflected from the original to a predetermined direction;

an image sensor for receiving the light from the reflecting mirror so as to input information of the illuminated original thereinto;

a case for enclosing at least the light source, reflecting mirror and image sensor; and a window formed on an upper surface of the case, for observing the information displayed on the original which is being optically read out by the image sensor.

BRIEF DESCRIPTION OF THE DRAWINGS

For a better understanding of the above-described object of the present invention, reference is made to the following detailed description of the invention to be read in conjunction with the following drawings, in which.

DETAILED DESCRIPTION OF THE PREFERRED EMBODIMENTS

Figure 1:
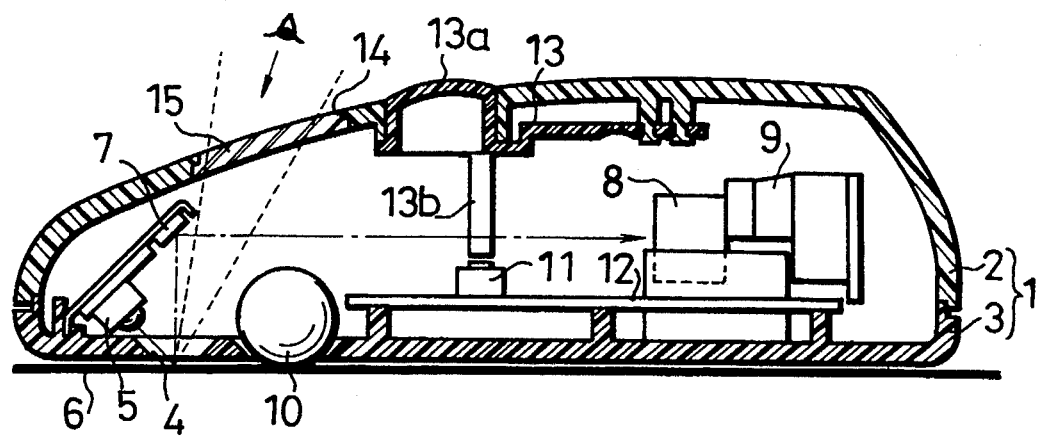
FIG. 1 is a cross-sectional view of an image scanner according to a preferred embodiment of the invention.
Figure 2:
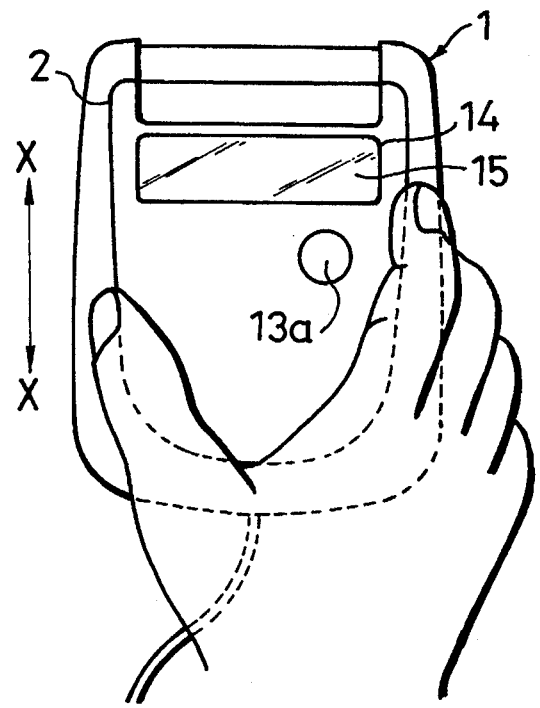
FIG. 2 is a plan view of the image scanner, shown in FIG. 1, under operation.

FIG. 1 is a cross-sectional view of an image scanner according to one preferred embodiment of the present invention. FIG. 2 is a plan view of the above-described image scanner which is under operation.

In these figures, reference numeral I indicates a case for forming an outer shell of the image scanner, and is constructed by an upper case 2 and a lower case 3. Reference numeral 4 denotes an opening formed in the lower case 3, reference numeral 5 represents a light source such as a light-emitting diode (LED) for illuminating an original 6 via the opening 4, reference numeral 7 is a reflecting mirror for refracting the light reflected from the original 6 in the horizontal direction, reference numeral 8 denotes a focusing lens positioned in an optical path defined by the reflecting mirror, and reference numeral 9 indicates an image sensor for receiving the light reflected from the original 6 via the reflecting mirror 7 and the focusing lens 8 so as to input the information of the original 6.

Furthermore, reference numeral 10 indicates a roller for sensing an amount of travel, and reference numeral 11 denotes a push-button switch mounted on a circuit board 12. These light source 5, reflecting mirror 7, focusing lens 8, image sensor 9 and circuit board 12 are mounted on the lower case.

In addition, reference numeral 13 indicates a switch member supported on a lower surface of the upper case 2 for upward and downward movement. A keytop 13a of the switch member 13 is exposed from the upper surface of the upper case 2, and an actuator 13b vertically formed on the switch member 13 is positioned opposite to the push-button switch 11 at the position outside the above-described optical path. Reference numeral 14 indicates a window formed on the upper surface of the upper case 2, through which the above-described opening 4 is visible, and reference numeral 15 represents a filter inserted into this window 14. The filter 15 is made of a colored transparent material, i.e., a coloring agent being mixed into a transparent material such as an acrylic resin.

With the above-described construction, an operator manually operates the case 1 to bring it on a predetermined position on the original 6 while reading the information from the original 6, and thereafter, depresses the keytop 13a by his finger to turn on the push-button switch 11. Accordingly, the light source 5 is turned on, and since the operator can observe the light derived from the light source 5 via the filter 15, he can recognize that the image scanner can be turned on, and more over, can observe outside the image scanner, the original 6 via the filter 15 and the opening 4, i.e., the information at the starting point of the optical reading by the image sensor 9.

Under these circumstances, when it is confirmed that the image scanner is positioned on the correct starting position for the information reading, the case 1 of the image scanner is moved in an X-direction of FIG. 2. That is to say, the image scanner is transported in a direction perpendicular to an axis direction of the roller for sensing an amount of movement 10. As a result, the optically read information is input via the opening 4, reflecting mirror 7 and lens 8 to the image sensor 9. It should be noted that in this case, the image sensor 9 per se scans the original 6 in a width direction of the opening 4 (i.e., a direction perpendicular to the moving direction of the case 1), so as to input the information thereof. According to the preferred embodiment, since the information input into the image sensor 9 can be visually and simultaneously confirmed outside the case 1 through the filter 15 while transporting the case 1 of the image scanner, a real time judgement can be accomplished whether or not the desirable information of the original 6 is correctly input.

Also, in the preferred embodiment, the filter 15 is inserted into the window 14 functioning as a readable information monitor so that dust can hardly penetrate into the case 1. Since the filter 15 is made of the colored transparent material, it has a first function to light-shield the interior of the case 1 while the image scanner is inoperative, i.e., the light source 5 is turned off, and has a second function to prevent the reading error by cutting the penetration of the incoming light such as fluorescent lamp while the image scanner is under operation.

Figure 3:
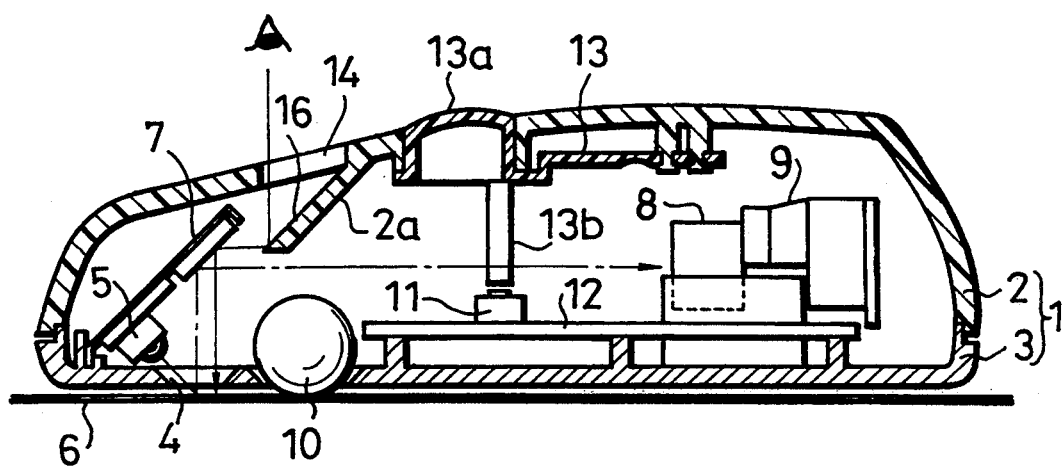
FIG. 3 is a cross-sectional view of an image scanner according to a second preferred embodiment of the invention.

FIG. 3 is a cross-sectional view of an image scanner according to another preferred embodiment of the invention. It should be noted that the same reference numerals shown in FIG. 1 will be employed as those for denoting the same elements shown in FIG. 2.

In the preferred embodiment, an extending wall 2a is formed near the window 14 pierced in the upper case 2, which extends toward the interior of the case 1 at a certain inclined angle with respect to the window 14. The surface of the extending wall 2a is manufactured as a mirror which, thus, functions as a second reflecting mirror 16. This second reflecting mirror 16 is positioned opposite to the above-described reflecting mirror 7 so that after the light illuminated from the light source 5 is reflected from the portion of the original 6 which can be observed through the opening 4, it is transported via the reflective mirror 7 and lens 8 to the image sensor 9, and also a part of the reflected light can be observed through the reflecting mirror and the second reflecting mirror 16 outside the case 1. Accordingly, the second reflecting mirror 16 may have such a reflectivity that the portion of the original 6 can be visually confirmed through the opening 4 while the light source 5 is turned on. Taking account of the adverse influence of the light coming from the outside of the case 1, the reflectivity of the second reflecting mirror 16 may be considerably lower than that of the remaining reflecting mirror 7.

In the preferred embodiment shown in FIG. 3, since the remaining components of the image scanner are similar to those of the first-mentioned image scanner, no further explanation is made in the specification. It should be, however, noted that as the optical path defined by the opening 4 and the window 14 can be arbitrarily set by means of the second reflecting mirror 16, the setting position of the window 14 on the upper case 2 can be relatively freely selected, which thereby causes a freedom of the case design. In the present embodiment, a filter may be also inserted into the window 14 so as to prevent the penetration of dust inside the case 1. In this case, the filter may be made of a non-colored transparent material of a similar material.

Figure 4:
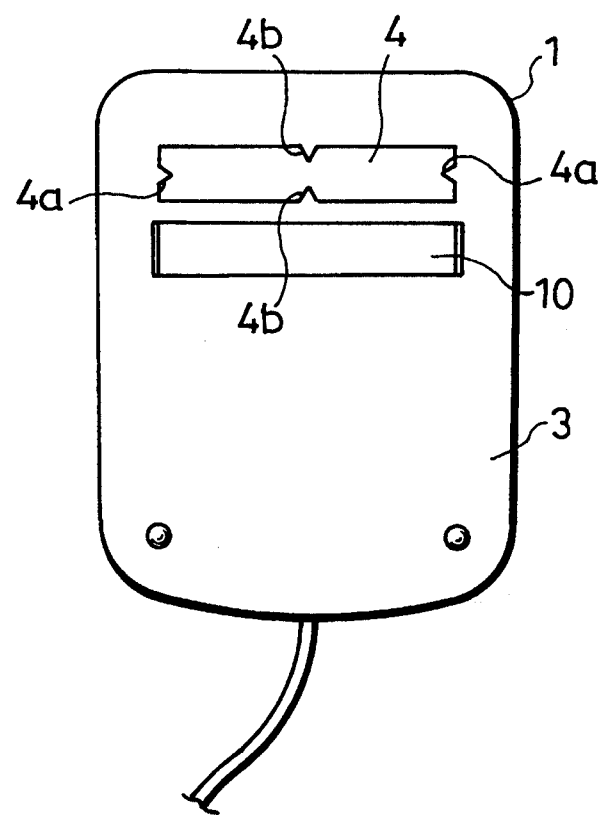
FIG. 4 is a rear view of an image scanner according to a third preferred embodiment of the invention; and, FIG. 5 is a plan view of the image scanner, shown in FIG. 4, during the scanning operation.
Figure 5:
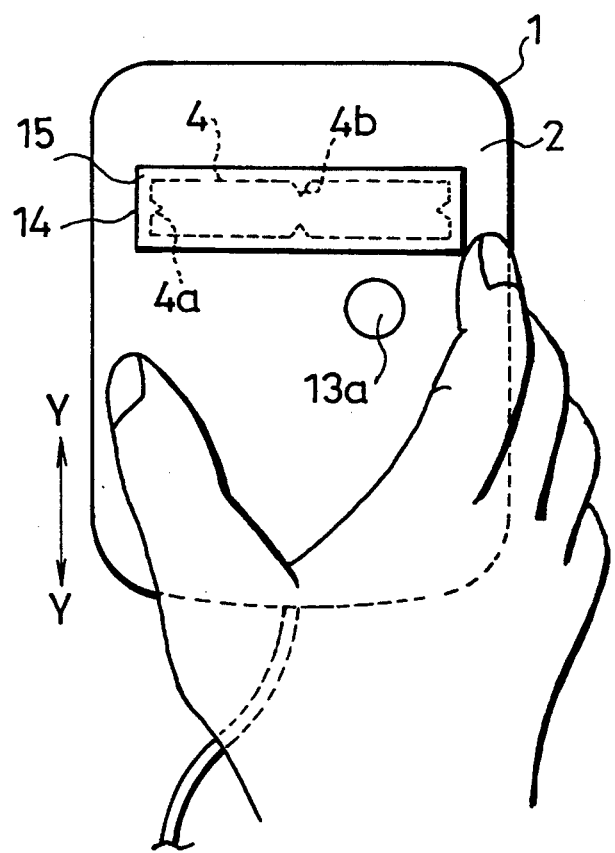

Referring now to FIGS. 4 and 5, an image scanner according to a third preferred embodiment will now be described. FIG. 4 is a rear view of the image scanner and FIG. 5 is a plan view of the image scanner during the scanning operation.

It should be noted that the same reference numerals in FIGS. 1 to 3 will be used for denoting the same or similar components shown in FIGS. 4 and 5.

In FIG. 3, there is similarly provided the opening 4 above the roller for sensing an amount of movement 10 in the vertical direction. Two pairs of triangle marks 4a and 4b are formed on the edges of the opening 4. That is to say, a pair of triangle marks 4a are formed on central positions of shorter (vertical) edges of the opening 4, whereas another pair of triangle marks 4b are formed on central positions of longer (horizontal) edges of the opening 4. These triangle marks 4a and 4b are projected toward an inside of the opening 4.

While scanning the image scanner over the original 6 (shown in FIG. 1), an operator can observe a contour line of the opening 4 containing the respective triangle marks 4a and 4b through the filter 15, as illustrated in FIG. 5. The image scanner can be correctly positioned to a starting position for the image reading by making the information to be optically read coincident with an imaginary line connecting the summits of both triangle marks 4a formed on the shorter edges of the opening 4.

In the third preferred embodiment as illustrated in FIGS. 4 and 5, since the triangle marks 4a and 4b are formed on all edges of the opening 4, the starting position for optically reading the information can be correctly set by utilizing both triangle marks 4a formed on the shorter edges, and also the information to be read can be correctly, optically input into the image scanner by utilizing both triangle marks 4b formed on the longer edges. As a result, in case that the case 1 per se has no guiding plane in the sub-scanning direction of the image scanner since the side of the case 1 is formed in a curved surface, there is a particular advantage in the scanning operation of the image scanner having triangle marks according to the preferred embodiment.

Moreover, it should be understood that the shape of these marks 4a and 4b is not restricted to the above-described third preferred embodiment, but, for instance, marks may be projected outwardly from the opening 4.

As previously described, the window is formed on the upper surface of the case forming the outer shell of the image scanner, through which the reading information of the original can be observed according to the invention. Consequently, an operator can readily observe the reading information via this window of the case in real time.

In other words, since the window for monitoring the information of the original is formed on the upper surface of the case, the information to be read can be monitored in real time even if such an information is shielded by the case of the image scanner. In the handy type image scanner, both the reliability and operationability of the image scanner can be considerably improved according to the invention.

What is claimed is:

1. An image scanner comprising:
    a light source for illuminating an original;
    a reflecting mirror for reflecting light reflected from the original to a predetermined direction;
    an image sensor for receiving the light reflected from the reflecting mirror so as to input information from the illuminated original thereunto;
    a case for enclosing the light source, mirror, and image sensor and having a lower surface slidable across the original;
    a window formed on a upper surface of the case, for observing the original;
    an opening in the lower surface of the case for allowing the light from the light source to pass through the case to the original; and
    a cylindrical roller for sensing an amount of movement over the original, said roller being rotatable on the original.

2. An image scanner as claimed in claim 1, further comprising a second reflecting mirror that is positioned opposite to said reflecting mirror and inside said window, the optically reading information of the original being observed through said window, second reflecting mirror, and said reflecting mirror.

3. An image scanner as claimed in claim 2, wherein reflectivity of said second reflecting mirror is considerably lower than that of the reflecting mirror.

4. An image scanner as claimed in claim 1,
    wherein said roller is fixed to said lower surface of said case adjacent to said opening; and
    said opening defines marks formed on at least two opposing sides thereof, said marks being observable through said window.

5. An image scanner as claimed in claim 4,
    wherein said marks are formed at two opposing side edges of said opening, said two opposing side edges being perpendicular to an axial line of said cylindrical roller.

6. An image scanner as claimed in claim 5, further comprising marks formed on two other opposing side edges of said opening, said two other opposing side edges being parallel to an axial line of said cylindrical roller.

7. An image scanner as claimed in claim 4, wherein said marks are formed in such a manner that projecting portions of said marks project toward the opening direction.

8. An image scanner as claimed in claim 7, wherein said marks are formed in a triangle shape which project inwardly into the opening.

9. An image scanner as claimed in claim 1, further comprising:
    a switch member mounted on a first portion of the case; and
    a switch actuated by the switch member for actuating the light source mounted on a second portion of the case apart from the first portion.

10. An image scanner as claimed in claim 9, wherein the switch member is mounted to one side of a center line of the case.

11. An image scanner as claimed in claim 2, wherein the second reflecting mirror is mounted on the case adjacent to the window.

12. An image scanner as claimed in claim 1, further comprising:
    a first support fixed to said case, wherein said mirror and said light source are mounted on said first support; and
    a second support fixed to said case independently from said first support, wherein said image sensor is mounted on said second support.

13. An image scanner as claimed in claim 1,
    wherein a filter of a colored transparent material is formed in said window, said filter having low permeability to light.

14. A portable image scanner comprising a light source for illuminating a reading portion to be read on an objective image plane, a reflecting member for refracting image light reflected in a substantially vertical direction from the reading portion, an image sensor which receives said image light sent through said reflecting member and is adapted to convert said image light to corresponding image data signals, a housing accommodating said light source, reflecting member and image sensor, and a sub-scanning drive member for allowing the scanner to move in a sub-scanning direction, said housing being provided at its lower surface with a reading aperture and at its upper surface with a peep hole displaced to the image sensor side with respect to a portion substantially right above said reading aperture so as to form a viewing path inclined against said image sensor side.

15. A portable image scanner according to claim 14, wherein said light source is disposed on the forward upper-side of said reading aperture so as to illuminate said reading aperture from the upper front and said image sensor is disposed on the rearward side of and on a level with said reflecting member.

16. A portable image scanner according to claim 14, wherein said sub-scanning drive member is a roller.

17. A portable image scanner according to claim 14, wherein said peep hole is closed with a filter member having low permeability to light.

18. A portable image scanner according to claim 17, wherein said filter member is formed in a part of a decorative cover covering partly said housing.

* * * * *